United States Patent [19]

Lee

[11] Patent Number: 5,661,846
[45] Date of Patent: Aug. 26, 1997

[54] REVERSELY REPRODUCING APPARATUS FOR DVCR

[75] Inventor: Doo Hee Lee, Kwacheon-si, Rep. of Korea

[73] Assignee: LG Electronics Inc., Seoul, Rep. of Korea

[21] Appl. No.: 605,890

[22] Filed: Feb. 23, 1996

[30] Foreign Application Priority Data

Feb. 23, 1995 [KR] Rep. of Korea .................. 3552/1995

[51] Int. Cl.$^6$ .............................. H04N 5/92; H04N 5/93
[52] U.S. Cl. .................. 386/68; 386/69; 386/95; 386/124; 360/32; 360/48
[58] Field of Search ...................... 360/32, 40, 48, 360/39, 54, 10.1, 10.3, 51; 386/95, 40, 124, 125, 126, 6–8, 68

[56] References Cited

U.S. PATENT DOCUMENTS 4,802,032  1/1989  Tatsuzawa et al. ............ 360/77.13
4,879,731  11/1989  Brush ............................ 375/116
4,930,024  5/1990  Kanda et al. .................... 360/10.1
5,130,861  7/1992  Suma ................................ 360/32

*Primary Examiner*—Thai Tran
*Assistant Examiner*—Aung S. Moe
*Attorney, Agent, or Firm*—Morgan, Lewis and Bockius, LLP

[57] ABSTRACT

A reproducing apparatus for a DVCR having a reverse operation function includes a data restoring portion for restoring a serial clock and reverse-serial data from an input signal; a servo portion for outputting a reverse-playback signal; an ID detector for detecting an ID to thereby output first and second segment end signals; and a sync signal detector for detecting a block sync signal and a signal indicative of an initial position of a track for reverse playback, using the serial clock and reverse-serial data from the data restoring portion and the first and second segment end signals from the ID detector. The reproducing apparatus enables reverse playback as well as reverse playback skip play.

8 Claims, 7 Drawing Sheets

F I G.7
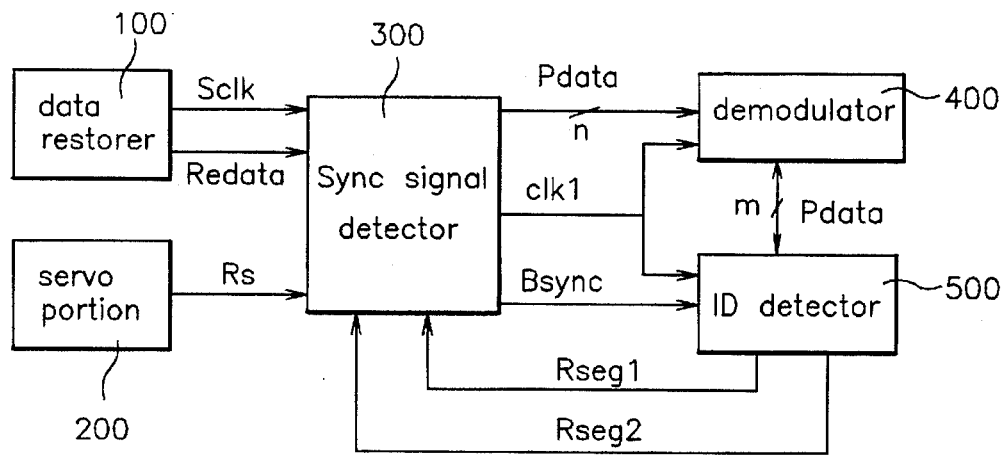
F I G.8
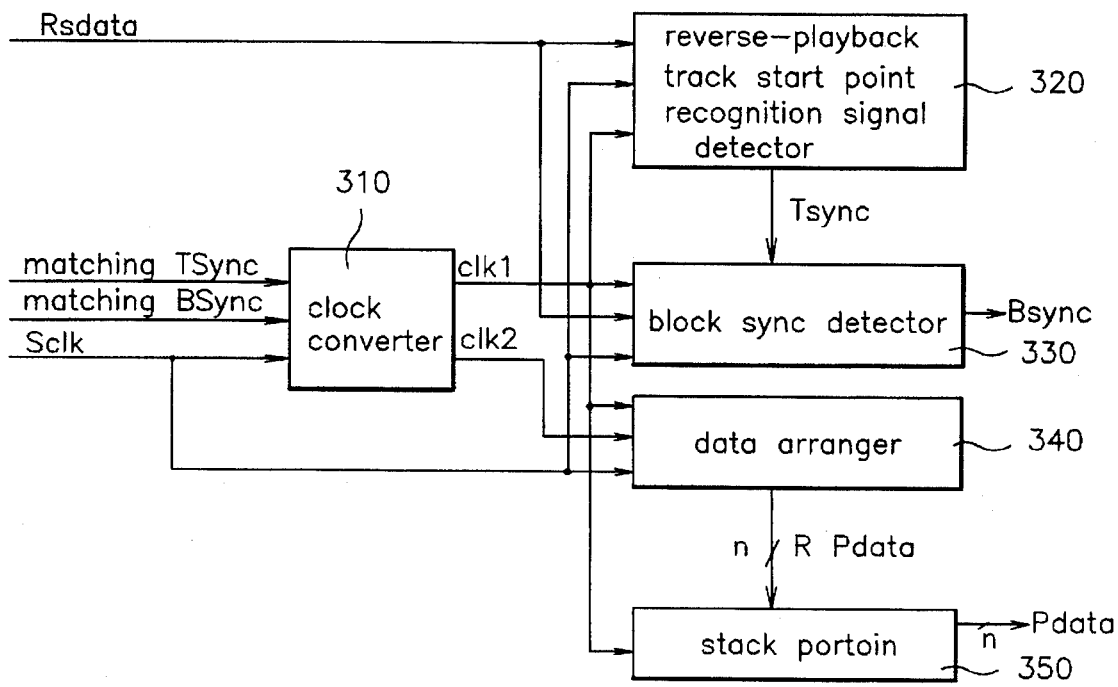

F I G. 9
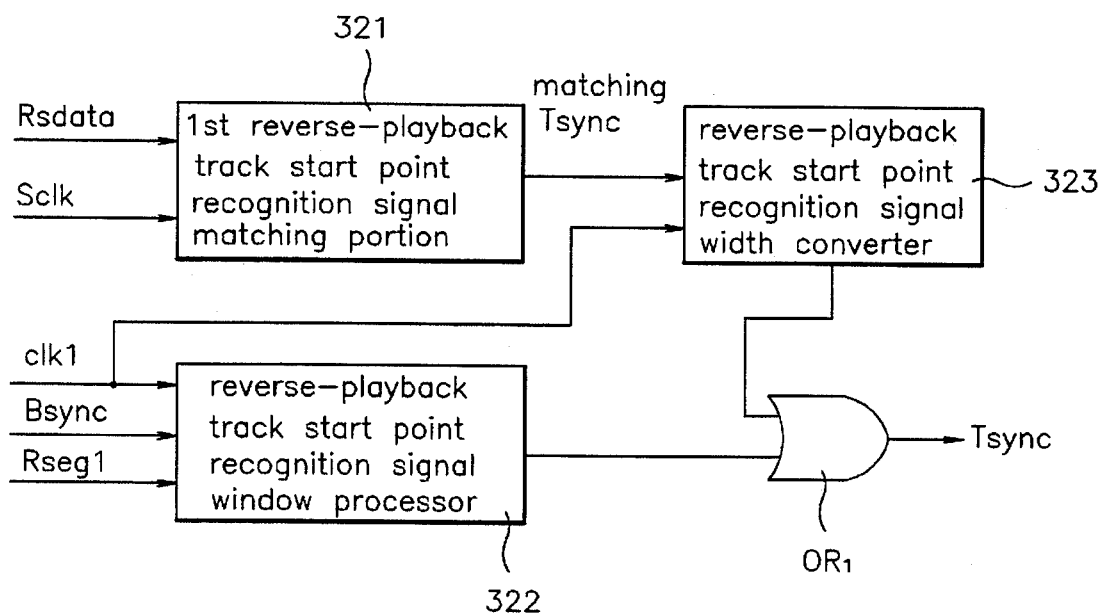
F I G. 10
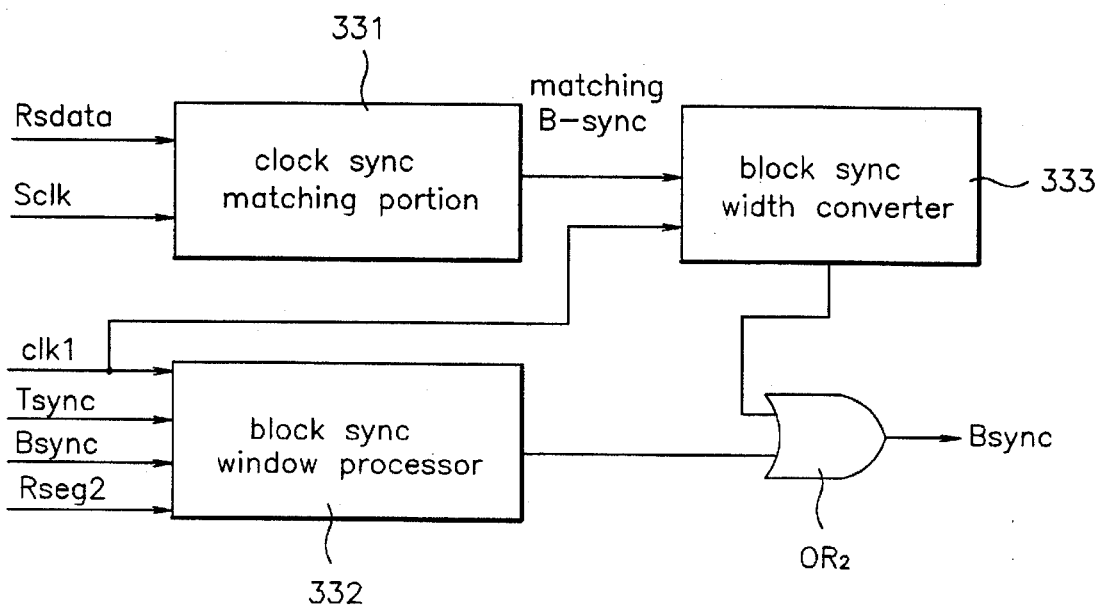

F I G.13
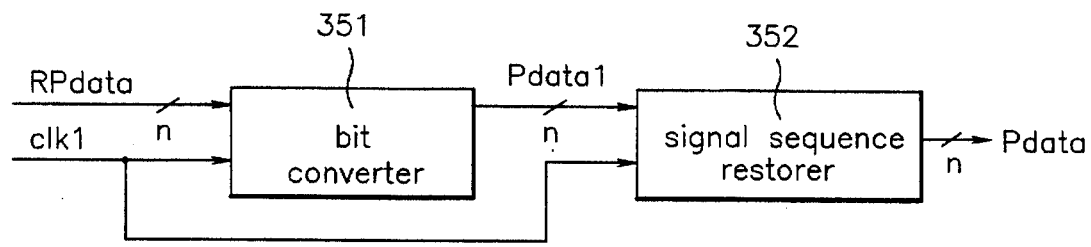
F I G.14
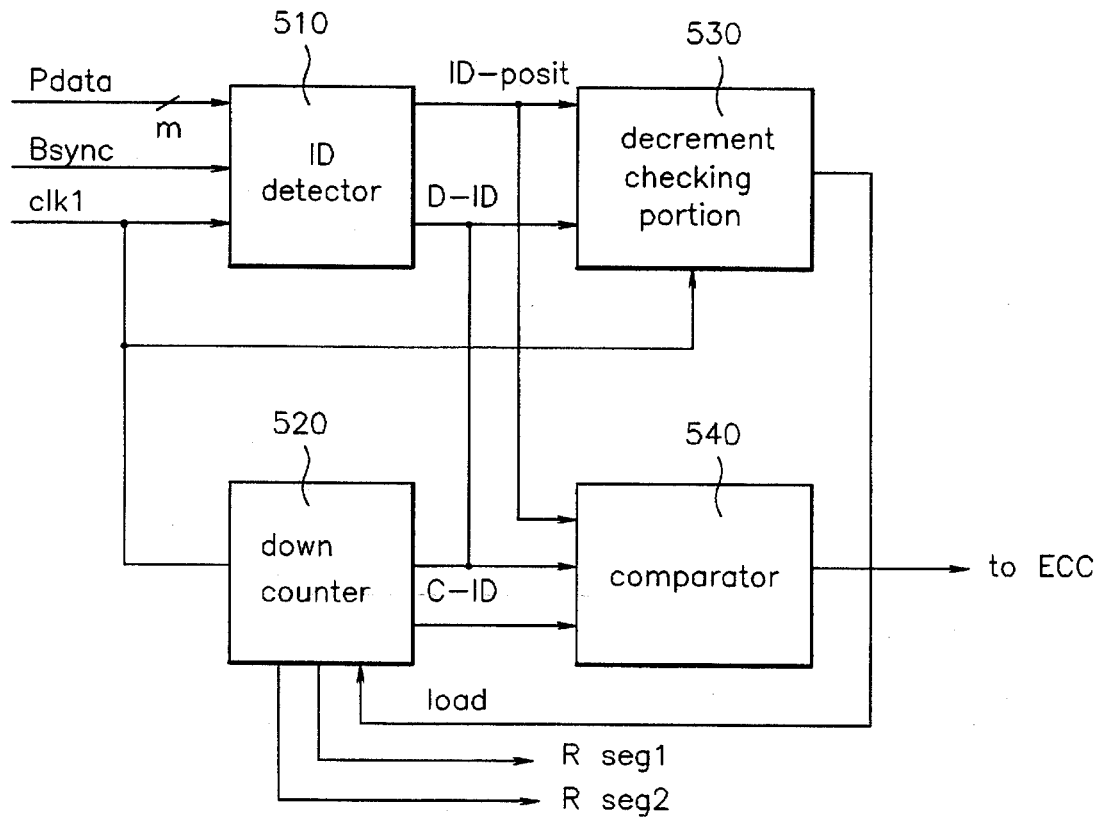

REVERSELY REPRODUCING APPARATUS FOR DVCR

BACKGROUND OF THE INVENTION

The present invention relates to a reproducing apparatus for a DVCR (digital video cassette recorder) having a reverse operation function and, more particularly, to a reproducing apparatus for a DVCR which is capable of reverse playback of data by reversing the rotation direction of the head as well as the traveling direction of the tape.

Generally, the traveling direction of the tape and the rotation of the drum are performed in the same direction only (unidirectionally) in playing a DVCR. FIG. 1 shows the tape traveling direction and video head rotation direction in reading data recorded on the tape. In this drawing, the traveling direction of the tape and the rotation direction of the drum are designed to be the same (unidirectional) so that the rotation of the video head is always performed upward from the bottom of the tape.

Meanwhile, FIG. 2 is a block diagram of a sync signal detector for detecting a sync signal when the rotation direction of the drum and the traveling direction of the tape are the same (unidirectional). There are two types of sync signal detection, that is, parallel and serial sync signal detections. Here, only the parallel sync signal will be explained with reference to U.S. Pat. No. 4,879,731.

Like the serial sync signal detection, in the parallel mode, a serial clock Sclk and serial data Sdata are received to form a parallel clock Pclk and parallel data Pdata via a serial/parallel converter 1.

The parallel data and parallel clock are compared with a predetermined sync pattern by detector 2 and comparator 3, thereby detecting a sync signal. Here, the procedure for comparing the sync pattern with the parallel data is different from that of the serial mode. This is because M-N modulation/demodulation requires N comparators, and a sync signal detected from the N comparators becomes the final form of the sync signal and re-arranged data using an encoder and decoder.

As to the comparison result, if a slip occurs before or after the position where the sync signal is detected, a signal SYNC-IN-WINDOW is moved using first and third signal generators 4 and 6. If the sync signal is produced within the signal SYNC-IN-WINDOW, this is regarded as being actual. In other cases, it is regarded that the sync signal is detected falsely.

Meanwhile, in the prior art DVCR, the video head rotation direction and tape traveling direction are unidirectional so that only forward data playback, but not reverse data playback, is enabled.

SUMMARY OF THE INVENTION

Therefore, in order to overcome problems such as those described above, it is an object of the present invention to provide a reproducing apparatus for a DVCR having a reverse operation function for reversing the rotation direction of the video head and the tape traveling direction based on the detection of a sync signal by a sync pattern in the reverse rotation of the drum, the reverse traveling direction of the tape, and/or reverse playback, as well as the reverse detection of an ID (identification) recorded in units of sync clocks during recording. Other objects and advantages of the invention will be set forth in the description which follows or will be obvious from the description or may be learned by practice of the invention.

To accomplish the objects of the present invention, there is provided a reproducing apparatus for a DVCR having a reverse operation function, the reproducing apparatus including a data restoring portion for restoring a serial clock and reverse-serial data from an input signal; a servo portion for outputting a reverse-playback signal; an ID detector for detecting an ID to thereby output first and second segment end signals; and a sync signal detector for detecting a block sync signal and a signal indicative of an initial position of a track for reverse playback, using the serial clock and reverse-serial data from the data restoring portion and the first and second segment end signals from the ID detector.

The foregoing general description and the following detailed description are exemplary only. They should not be construed as restrictive of the invention as claimed.

BRIEF DESCRIPTION OF THE ATTACHED DRAWINGS

FIG. 7 is a block diagram of a reproducing apparatus for a DVCR having a reverse operation function in accordance with the present invention;

FIG. 8 is a detailed block diagram of the sync signal detector of the present invention shown in FIG. 7;

FIG. 9 is a detailed block diagram of the reverse-playback track start point recognition signal detector of FIG. 8;

FIG. 10 is a detailed block diagram of the block sync detector of FIG. 8;

FIG. 13 is a detailed block diagram of the stack portion of FIG. 8; and

FIG. 14 is a detailed block diagram of the ID detector of FIG. 7.

DETAILED DESCRIPTION OF PREFERRED EMBODIMENT

A preferred embodiment of the present invention will now be described with reference to the attached drawings.

First of all, prior to the description of the present invention, there will be explained aspects of the signal flow in playback, the recording format of data recorded on tape, and the structure of a sync block.

Figure 1:
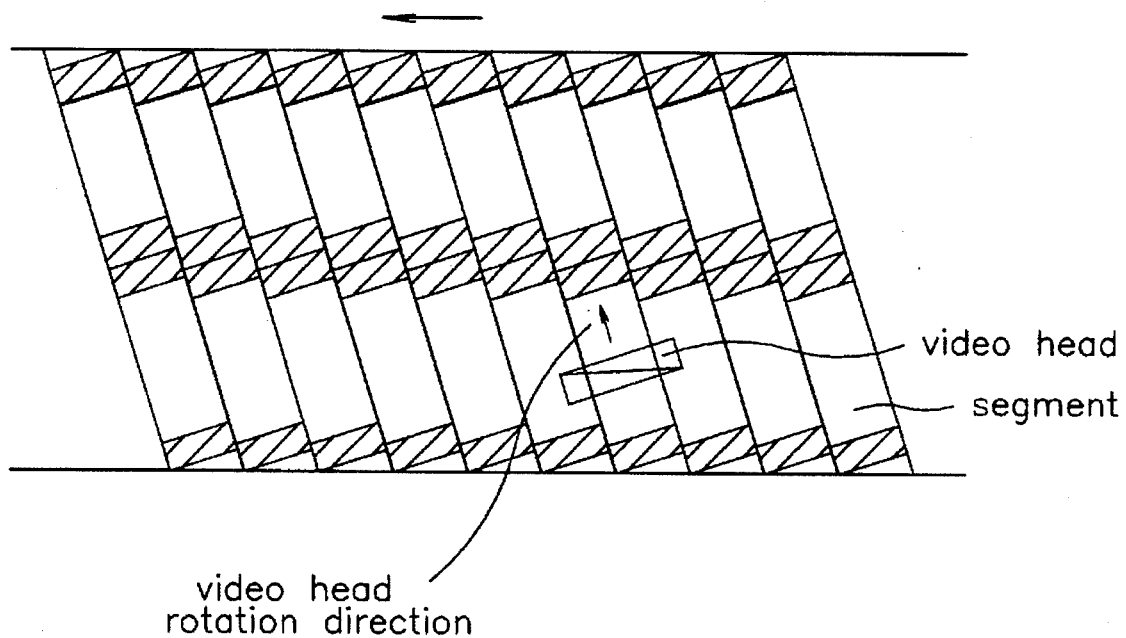
FIG. 1 shows the direction of a video head with respect to a tape in the playback of a general DVCR.
Figure 2:
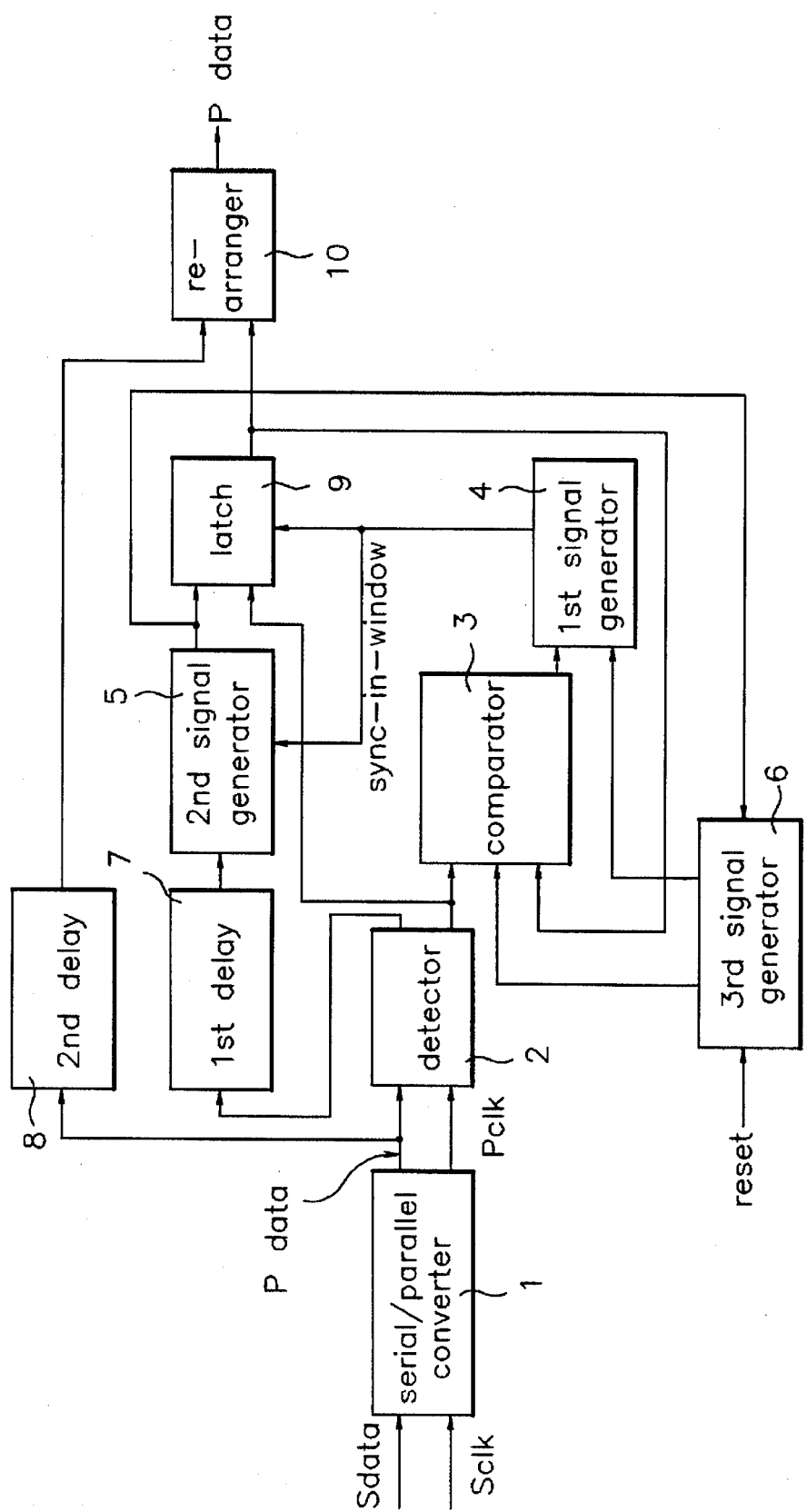
FIG. 2 is a block diagram of a parallel sync detector for a conventional DVCR.
Figure 3:
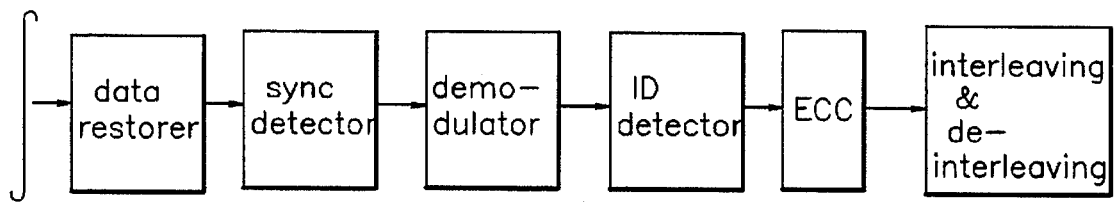
FIG. 3 is a block diagram showing the flow of a signal in the playback of a general DVCR.

FIG. 3 shows the sequence of the flow of a signal in the playback of a general DVCR. In the case of reverse playback, this sequence is the same, except that a sync detector and ID (identification) detector, explained later, are added.

Figure 4:
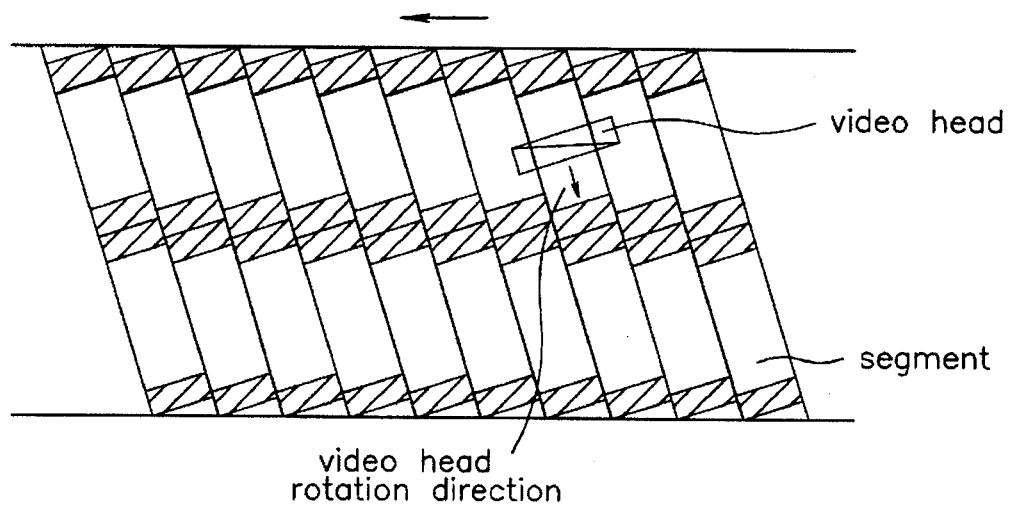
FIG. 4 shows the traveling direction of a tape and the rotation direction of a video head in the playback of a conventional DVCR.

FIG. 4 shows the tape traveling direction and the rotation direction of the video head in the reverse playback of a conventional DVCR. For VHS tape, reverse playback is enabled by recording only one segment within one track. Here, in FIG. 4, the hatched portion indicates a dummy data recording area, and the black portion indicates a track sync pattern for the track start point during reverse playback. Other portions are valid shuffle data areas.

Figure 5:
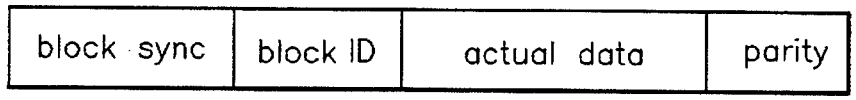
FIG. 5 shows the structure of a sync block of one segment in a conventional DVCR.

FIG. 5 shows the structure of a sync block recorded within one segment of a conventional DVCR. The sync block is formed with 2 sync bytes of a block sync pattern, one sync byte of a block ID, 104 sync bytes of actual data, and 8 sync bytes for parity.

Figure 6:
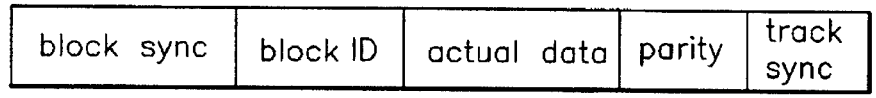
FIG. 6 shows a final sync block of one segment for reverse playback of a DVCR in accordance with the present invention.

FIG. 6 shows the structure of the final sync block in one segment for reverse playback of the DVCR of the present invention. As shown in FIG. 6, two sync bytes of a track sync pattern indicative of the reverse playback track start point are inserted at a portion where the final sync block ends and the dummy data starts.

Meanwhile, FIG. 7 shows the reproducing apparatus for the DVCR having a reverse operation function in accordance with the present invention. The reproducing apparatus comprises a data restorer 100, a servo portion 200, a sync signal detector 300, a demodulator 400, and an ID detector 500.

Data restorer 100 restores a serial clock Sclk and reverse-serial data Rsdata from the tape, and applies these to sync signal detector 300. Servo portion 200 applies a reverse-playback performing signal Rs according to operation of a reverse playback performing key by the user.

ID detector 500 receives a block sync signal and first clock clk1 from sync signal detector 300, and demodulator 400 receives m-bit parallel data, to thereby detect ID values 1 and 102. Then, first and second reverse segment end signals Rseg1 and Rseg2 are applied to sync signal detector 300. First and second reverse segment end signals Rseg1 and Rseg2 are segment end signals for first and second segments of one track because one track has two segments.

According to the signals applied from respective portions 100, 200 and 500, sync signal detector 300 outputs data in the form of sync bytes, a first clock clk1, a reverse playback track start point recognition signal (Tsync), and a block sync signal (Bsync) in accordance with the sync pattern.

As shown in FIG. 8, sync signal detector 300 comprises a clock converter 310, a reverse playback track start point recognition signal detector 320, a block sync detector 330, a data arranger 340, and a stack portion 350.

Clock converter 310 outputs first and second clocks clk1 and clk2, using serial clock Sclk and matching Bsync and matching Tsync passing the window.

Reverse playback track start point recognition signal detector 320 and block sync detector 330 detect Tsync and Bsync using reverse-serial data Rsdata and serial clock Sclk from data restorer 100 of FIG. 7 and first clock clk1 from clock converter 310.

Data arranger 340 outputs data in correspondence with the sync pattern using serial clock Sclk output from data restorer 100 of FIG. 7 and first and second clocks clk1 and clk2 from clock converter 310.

Stack portion 350 sequentially converts the MSB (most significant bit) and LSB (least significant bit) of data bits, using n-bit reverse-parallel data Rpdata from data arranger 340 and first clock clk1 from clock converter 310, and then arranges them in the sequence of block sync signal, ID, data, and parity in units of sync blocks. The thus arranged data in units of sync block are temporarily stored in a memory of the interleaving/de-interleaving portion via an ECC. The data is output in the sequence of interleaving in recording, by reversing the address for reading the data during the de-interleaving procedure.

Meanwhile, as shown in FIG. 9, reverse playback track start point recognition detector 320 for detecting Tsync in order to indicate the start point of data in reverse playback, comprises a first reverse playback track start point recognition signal matching portion 321, a reverse playback track start point recognition signal window processing portion 322, a reverse playback track start point recognition signal width converter 323, and an OR gate OR1.

When signals Rsdata and Sclk1 matching Tsync are applied to first reverse playback track start point recognition signal matching portion 321, this circuit detects the input in order to output matching Tsync.

Reverse playback track start point recognition signal window processing portion 322 opens a window in a predetermined section and closes the window if Bsync is input, with the reference of first reverse segment end signal Rseg1, using Bsync from block sync detector 330 of FIG. 8, first reverse segment end signal Rseg1 from ID detector 500 of FIG. 7, and first clock clk1 from clock converter 310 of FIG. 8.

With regard to reverse playback track start point recognition signal width converter 323, the output of reverse playback track start point recognition signal matching portion 321 is a first clock width signal which is formed using first clock clk1 from clock converter 310 of FIG. 8. This result is recognized as Tsync if it is present within the window of reverse playback track start point recognition signal window processing portion 322.

The outputs of reverse playback track start point window processing portion 322 and reverse playback track start point recognition signal width converter 323 are applied to OR gate OR1, thereby detecting a final Tsync.

FIG. 10 is a block diagram of the block sync detector 330. Block sync detector 330 includes a clock sync matching portion 331, a block sync window processing portion 332, a block sync width converter 333, and an OR gate OR2.

Like reverse playback track start point recognition signal detector 320 of FIG. 8, block sync detector 330 compares and determines whether the signal is present in the window in OR gate OR1. This OR gate receives the signal output after Bsync detected from block sync matching portion 331 is formed into first clock clk1 in block sync width converter 333, as well as the signal output from block sync window processing portion 332.

Block sync window processing portion 332 finds the initial Bsync from Tsync, and then opens or closes the window in a predetermined section from the detected Bsync so as to determine whether the detected Bsync is present inside the window. Such an operation is repeated while, in the intermediate dummy data, the window is opened in a predetermined section or closed if the detected sync signal is input, using the reference of second reverse segment end signal Rseg2 input from ID detector 500 of FIG. 7.

Figure 11A:
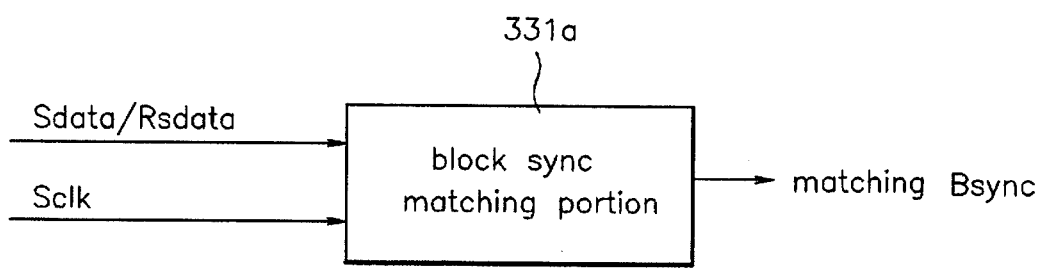
FIGS. 11A and 11B are detailed block diagrams of the block sync matching portion of FIG. 10.
Figure 11B:
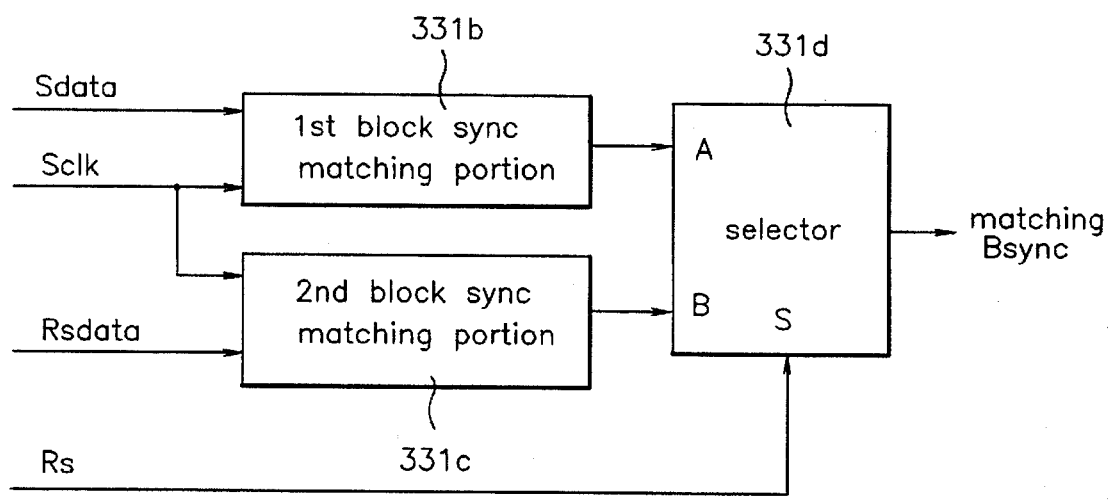

FIGS. 11A and 11B are block diagrams of block sync matching portion 331. The following two cases of detecting the block sync signal with the sync pattern are both enabled during general playback or reverse playback.

First of all, FIG. 11A shows the case where the block sync pattern is used both for general playback and reverse playback. Block sync matching portion 331a is used when the sync pattern is the same in case the sync pattern is detected from the MSB such as 1100110011 or from the LSB.

FIG. 11B shows the case where the sync patterns are different for general playback and reverse playback. The detection is performed with the sync pattern for reverse playback being 1001110011, if the sync pattern for general playback is 1100111001.

In other words, the outputs of first block sync matching portion 331b for outputting the matching Bsync in general playback and second block sync matching portion 331c for outputting the matching Bsync in reverse playback are selected and output from selector 331d according to reverse playback performing signal Rs from servo portion 200 of FIG. 7.

Figure 12:
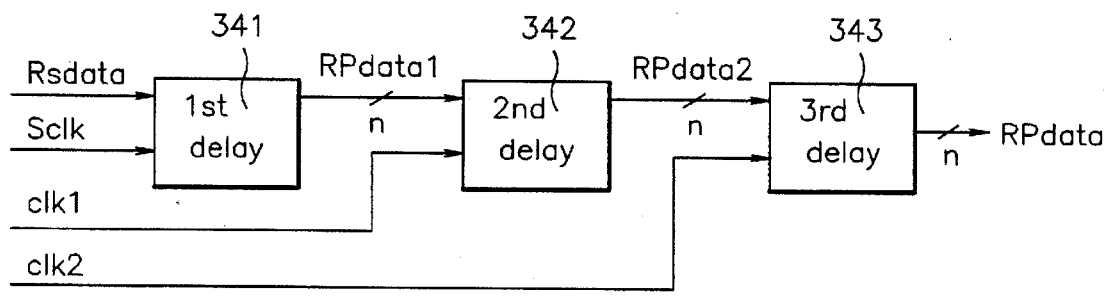
FIG. 12 is a detailed block diagram of the data arranger of FIG. 8.

Data arranger 340 of FIG. 8 which arranges data in units of blocks is formed with first, second and third delay portions 341, 342 and 343, as shown in FIG. 12. With reference to FIG. 12, first delay portion 341 receives reverse-serial data Rsdata and serial clock Sclk from data restorer 100 of FIG. 7, and thereby forms n-bit reverse-parallel data Rpdata1 by delaying such data N times.

The output of first delay portion 341 is input to second delay portion 342 to be latched with second clock clk2 formed with the reference of the matched Tsync and Bsync of FIGS. 11A and 11B. The output of second delay portion 342 is input to third delay portion 343 to be finally latched thereby with first clock clk1, whose duty cycle is always 50:50. The latched result is output as reverse-parallel data Rpdata. As shown in FIG. 13, stack portion 350 of FIG. 8 is formed with bit converter 351 and signal sequence restorer 352.

Bit converter 351 changes the MSB and LSB of the data bits with each other while latching n-bit reverse-parallel data Rpdata from third delay portion 343 with first clock clk1. This is because reverse-serial data Rsdata is input as the reverse of the serial data. Therefore, there is no problem in the demodulator because this is the same as the sequence of data bits in recording.

The output of bit converter 351 is input to signal sequence restorer 352, and arranged and output in the sequence of block sync signal, ID, data and parity in units of sync blocks. For this purpose, data input later in units of sync blocks is output earlier, and earlier input data is output later.

FIG. 14 is a block diagram of ID detector 500 for reverse playback for a DVCR of the present invention. ID detector 500 includes an ID detector 510, a down counter 520, a decrement checking portion 530, and a comparator 540.

ID detector 510 outputs a ID-Posit signal indicative of the position of ID and detected ID value D-ID to decrement checking portion 530 and comparator 540, using Bsync and data input after n-bit data from demodulator 400 of FIG. 7 is converted into m-bit data. The detected ID value D-ID is output to down counter 520.

Down counter 520 counts down sequentially by counting the ID value, which is counted up as 1, 2, 3, ..., 200, 201 and 202 in recording, from 202 in reverse playback. According to this counting, first and second reverse segment end signals Rseg1 and Rseg2 are output to indicate the end positions of the first and second segments of one track.

Decrement checking portion 530 detects whether the ID value detected in ID detector 351 is sequentially reduced. In this way, the respective values are loaded on down counter 520.

Down counter 520 outputs counted ID values C-ID. Comparator 540 discriminates whether the detected ID value D-ID and counted ID value C-ID are the same, using signal ID-Posit indicative of the position of ID and detected ID value D-ID from ID detector 510, and counted ID value C-ID. The discrimination result is used as an important signal for the ECC portion.

As described above, the reverse-type reproducing apparatus of the DVCR of the present invention is capable of restoring data during the reverse rotation of the drum and the reverse traveling of the tape, based on sync detection In reverse playback and the reverse detection of ID. This enables the reverse playback of the DVCR. In addition, the reverse-type reproducing apparatus of the present invention enables reverse playback skip play because the rotation direction of the drum and the traveling direction of the tape both are reverse.

Those skilled in the art will recognize that various modifications and variations can be made with respect to the present invention without departing from the spirit and scope thereof. Moreover, other embodiments of the invention will be apparent to those skilled in the art from consideration of the specification and practice of the invention. It is intended that the specification and examples be considered as exemplary only, with the actual scope of the invention being indicated by the claims and their equivalents.

What is claimed is:

1. A reproducing apparatus for a digital video cassette recorder (DVCR) having a reverse operation function, comprising:

a data restorer for restoring a serial clock and reverse-serial data from an input signal;

a servo portion for outputting a reverse-playback signal;

an ID detector for detecting an ID to thereby output first and second segment and signals; and a sync signal detector for detecting a block sync signal and a signal indicative of an initial position of a track for reverse playback, using the serial clock and reverse-serial data from the data restorer and the first and second segment and signals from the ID detector, wherein the sync signal detector includes:

a clock converter for generating first and second clocks according to the input of the serial clock from the data restorer, a matching block sync signal, and a signal indicative of an initial position of a track of reverse playback;

a reverse playback track start point recognition signal detector for detecting a reverse playback track start point recognition signal in order to find a start point of data in reverse playback, using the first clock from the clock converter and the reverse-serial data and serial clock of the data restorer;

a block sync detector for detecting a block sync signal, using the first clock of the clock converter and the reverse-serial data and serial clock from the data restorer;

a data arranger for arranging data in accordance with a sync pattern, using the first and second clocks from the clock converter and the serial clock from the data restorer; and a stack portion for changing a MSB and a LSB of data bits and arranging the MSB and LSB in original sync block units, using reverse-parallel data from the data arranger and the first clock of the clock converter.

2. A reproducing apparatus for a DVCR as claimed in claim 1, wherein the reverse playback track start point recognition signal detector comprises:

a reverse playback track start point recognition signal matching portion for detecting whether or not a signal matching the reverse playback track start point recognition signal is input, using the serial clock and reverse-serial data from the data restoring portion, to thereby output a matching signal indicative of the reverse playback track start point;

a reverse playback track start point recognition signal window processing portion for opening a window in a predetermined section and closing the window if a block sync signal is input, in accordance with a reference of the first reverse-serial segment end signal, using the block sync signal of the block sync detector, the first reverse segment end signal of the ID detector, and the first clock of the clock converter;

a reverse playback track start point recognition signal width converter for converting an output of the reverse playback track start point recognition signal matching portion into a first clock width signal, using the first clock of the clock converter; and an OR gate for logically summing outputs of the reverse playback track start point recognition signal window processing portion and the reverse playback track start point recognition signal width converter.

3. A reproducing apparatus for a DVCR as claimed in claim 1, wherein the block sync detector comprises:

a block sync matching portion for detecting whether or not a signal matching the block sync signal is input with the reverse-serial data and serial clock from the data restorer to thereby output a matching block sync signal;

a block sync window processing portion for finding an initial block sync signal from a signal indicative of the reverse playback track start point, and then determining whether the detected block sync signal is present in the window while opening or closing the window in a predetermined section based on the detected block sync signal;

a block sync width converter for forming an output of the block sync matching portion into a first clock width, using the first clock of the clock converter; and an OR gate for logically summing outputs of the block sync window processing portion and the block sync width converter, to thereby output a final block sync signal.

4. A reproducing apparatus for a DVCR as claimed in claim 3, wherein the block sync matching portion is formed using a single block sync matching device if a same sync pattern is used in both general playback and reverse playback.

5. A reproducing apparatus for a DVCR as claimed in claim 3, wherein the block sync matching portion comprises:

a first block sync matching device for generating a general-playback matching block sync signal if general playback and reverse playback have different sync patterns;

a second block sync matching device for generating a reverse-playback matching block sync signal; and a selector for selecting outputs of the first and second matching devices according to a reverse playback performing signal from the servo portion.

6. A reproducing apparatus for a DVCR as claimed in claim 1, wherein the data arranger comprises:

a first delay portion for receiving, and delaying N times, the reverse-serial data and serial clock from the data restorer and then outputting resulting data as reverse parallel data;

a second delay portion for latching and outputting an output of the first delay portion with the first clock of the clock converter; and a third delay portion for latching an output of the second delay portion with the second clock of the clock converter to thereby output final reverse-parallel data.

7. A reproducing apparatus for a DVCR as claimed in claim 1, wherein the stack portion comprises:

a bit converter for latching reverse-parallel data input to a third delay portion of the data arranger with a first output to thereby change the MSB and LSB of data bits with each other; and a signal sequence restorer for arranging an output of the bit converter in a sequence of sync signal, ID, data and parity in original sync block units.

8. A reproducing apparatus for a DVCR as claimed in claim 1, wherein the ID detector comprises:

an ID detector portion for outputting a signal indicative of a position of an ID and detected ID value, using data input from a demodulator and the block sync signal of the block sync detector;

a down counter for sequentially counting the detected ID value in reverse sequence from that of recording, thereby outputting first and second segment end signals and a counted ID value;

a decrement checking portion for detecting whether a detected ID value detected from the ID detector portion is reduced sequentially, and then loading detected values to the down counter; and a comparator for discriminating whether the detected ID value and counted ID value are equal, using the detected ID value and a signal indicative of a position of ID from the ID detector portion, and the counted ID value from the down counter.

* * * * *